Jan. 12, 1932. R. G. FEAR 1,840,353
CINEMATOGRAPHIC MOVEMENT
Filed March 16, 1931 2 Sheets-Sheet 1
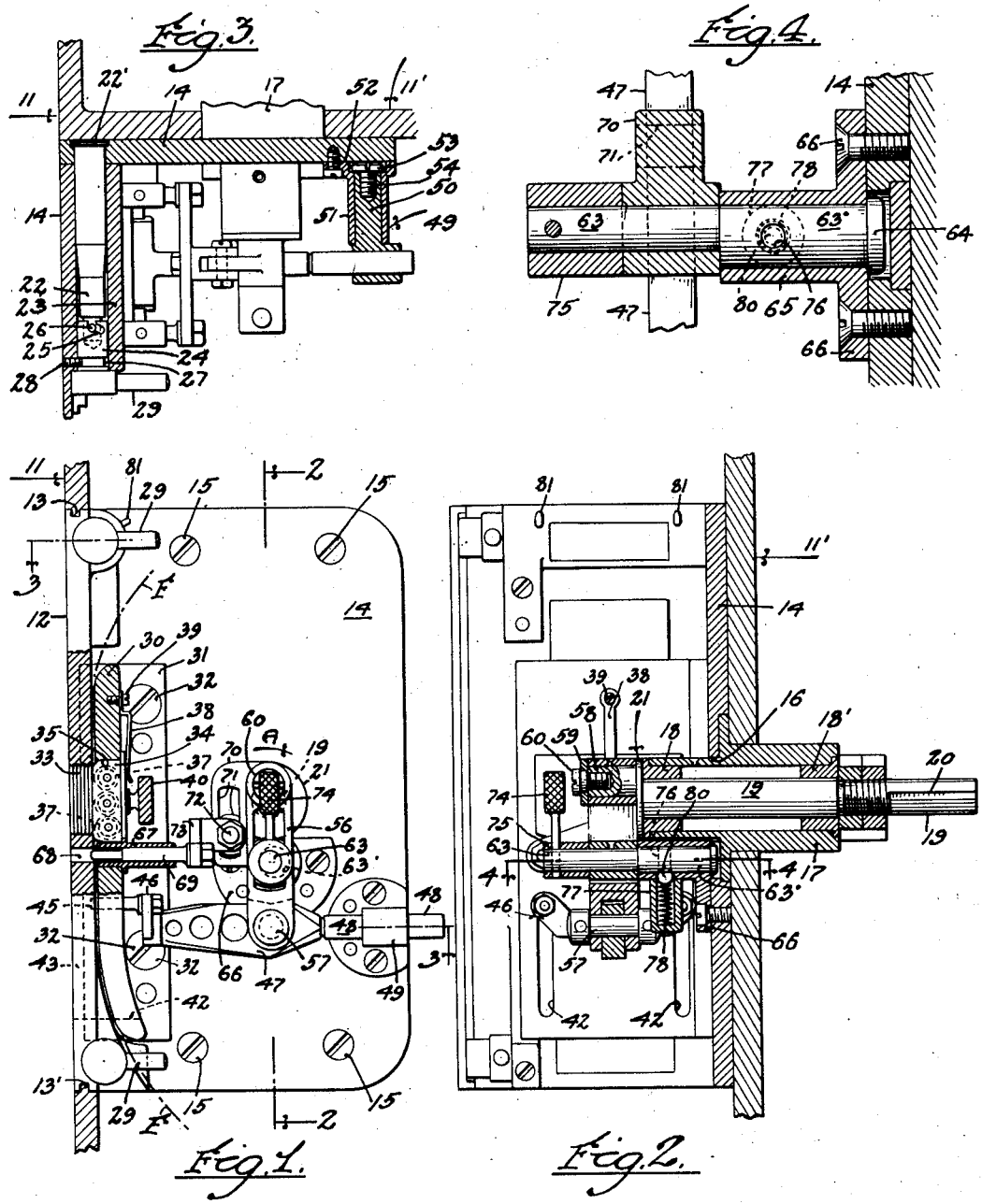
INVENTOR:
RALPH G. FEAR,
BY
ATTORNEY.

Jan. 12, 1932.     R. G. FEAR     1,840,353
CINEMATOGRAPHIC MOVEMENT
Filed March 16, 1931     2 Sheets-Sheet 2

INVENTOR:
RALPH G. FEAR,
BY
ATTORNEY.

Patented Jan. 12, 1932

1,840,353

UNITED STATES PATENT OFFICE

RALPH G. FEAR, OF HOLLYWOOD, CALIFORNIA

CINEMATOGRAPHIC MOVEMENT

Application filed March 16, 1931. Serial No. 522,805.

This invention has to do with mechanical movements and is more particularly related to that type of mechanical movement ordinarily designated as an intermittent movement and used in connection with motion picture apparatus.

The general construction followed in movements of this character embodies a shuttle fork which is adapted to engage the perforations in the motion picture film and through such engagement to move the film through a predetermined distance and a pilot pin which is adapted to engage the perforations in the film just prior to the withdrawal of the shuttle fork so as to hold the film stationary while the shuttle fork is being moved to a position at which it is again brought into engagement with the film.

It is important in the operation of devices of this character that the film be moved rapidly and remain stationary over the longest possible period of time during the return movement of the shuttle fork. This permits proper exposure of the film in the event the movement is embodied in a motion picture camera and permits the proper projection of the image on the film in the event the movement is embodied in a motion picture projection machine.

It is of the utmost importance in devices of this character that the movement of the shuttle fork and the pilot pin be accurately timed so that both the pilot pin and the shuttle fork are in engagement with film perforations at each end of the shuttle fork stroke. Such engagement is, of course, almost instantaneous in that the shuttle fork is constructed so as to start drawing the film downwardly immediately after it enters the perforation, and such downward movement must take place after the pilot pin has been withdrawn.

In the use of motion picture cameras in connection with so-called sound photography, it is also important that the cameras be noiseless in operation, and the device contemplated by this invention has as an object the improvement of the accuracy of movements of this character and the elimination of all noise ordinarily attending their operation.

It is important in obtaining the proper correlation between the movement of the pilot pin and the movement of the shuttle fork to have these members operated from the same source of power and preferably from a common movable member. In my co-pending application, Serial No. 337,700, which was filed on February 5, 1929, I disclose an intermittent movement in which both the pilot pin and the shuttle fork are operated from a harmonic cam which is mounted upon a suitable wheel crank and although this movement has proven to be satisfactory and has met with great favor in the motion picture industry, I consider it an important object of the present invention to eliminate the cam and operate the movement directly from a suitable crank. Cams of the nature referred to above are rather expensive to cut, inasmuch as they must be made with the finest accuracy, and it is a feature of this invention that the expense attending the production of such cams is eliminated.

As pointed out above, the present invention contemplates the elimination of all cams in the intermittent movement so that the wearing parts are of extremely simple construction and may be readily replaced or refaced when they become worn. It therefore develops as a further object of this invention to produce a movement which has the utmost accuracy and efficiency in operation and is at the same time of such simple construction that it may be economically manufactured.

It is a further object of this invention to produce a movement of the class described which is constructed so that both the pilot pin and shuttle fork may be easily moved to inoperative position to facilitate threading of the camera, and in connection with the threading operation I have devised a novel form of threading pin which may be used to support the film prior to and during the threading operation so that the film perforations are positively aligned with the pilot pin when the film is placed between the aperture plate and the bushing plate. This obviates the necessity of adjusting the film to the proper position after the camera has been threaded.

The details in the construction of a preferred form of my invention, together with other objects attending its production, will be best understood from the following description of the accompanying drawings which are chosen for illustrative purposes only, and in which Fig. 1 is an elevational view partly in section showing an intermittent movement of the type contemplated by this invention;

Fig. 2 is a sectional elevation which may be considered as having been taken in a plane represented by the line 2—2 in Fig. 1;

Fig. 3 is a plan section taken in a plane represented by the line 3—3 in Fig. 1;

Fig. 4 is an enlarged plan section taken in a plane represented by the line 4—4 in Fig. 2 and illustrating the details in the construction of the eccentric support which is used in throwing the pilot pin out of operative position for threading the camera;

Figure 5:
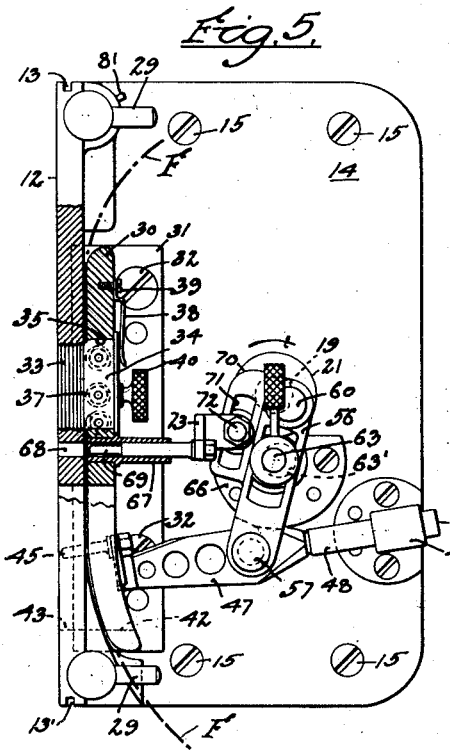
Fig. 5 is an elevational view similar to Fig. 1, showing the parts as having been moved partly through a film advancing step.

More particularly describing the invention as herein illustrated, reference numeral 11 indicates a camera housing in which an aperture plate 12 is slidably mounted through the medium of tongues and grooves indicated by reference numerals 13 and 13'. Reference numeral 14 indicates a back plate which is mounted upon a side or partition member 11' of the camera housing by means of screws 15. The partition member 11' is provided wth an aperture 16 through which a bushing 17 extends. The bushing 17 is provided with bearings 18 and 18' which rotatably support a drive shaft 19. The outer end portion of the drive shaft 19 is provided with a groove 20 whereby it may be keyed to any suitable source of power and the inner end of the drive shaft is provided with a wheel crank 21 which forms a part of the intermittent movement to be hereinafter more fully described.

Reference numeral 22 indicates a pin which is mounted in the forward edge of the back or supporting plate 14 and the pin 22 cooperates with a sleeve member 23 formed on the aperture plate to provide a lock for holding the aperture plate in position. It will be noted that the end of the sleeve 23 opposite the head 22' of the pin 22 receives a sleeve member 24 which is notched at 25, the notch being associated with a key 26 on the pin 22 to form a bayonet joint. The sleeve 23 is provided with an annular groove 27 which receives the inner end of a screw 28, thereby holding the sleeve in place, and the outer end portion of the sleeve is provided with an operating handle 29. A device of this kind is provided at both the top and bottom edges of the aperture plate 12 for the purpose of locking the aperture plate in position in the camera housing.

Reference numeral 30 indicates a guide plate or bushing plate which is provided with a flange 31 whereby it is screwed to the supporting plate 14 through the medium of screws 32. This bushing plate 30 is placed immediately adjacent the inner surface of the aperture plate and cooperates with the aperture plate 12 to define a narrow passage through which the motion picture film passes, as indicated in the dot and dash lines by the letter F.

The aperture plate 12 is provided with an exposure aperture 33 of the usual type and a pressure plate 34 is mounted in an aperture 35 on the guide plate 30 immediately behind the aperture 33. This pressure plate may be of any well known construction, being provided with rollers 37 for engaging the back of the film, and is held in position by means of a spring finger 38 which is secured to the back of the guide plate by means of the screw 39. Reference numeral 40 indicates a knob or handle which may be used in withdrawing the pressure plate during a film threading operation.

It will be noted that the lower end portion of the back plate 30 is curved rearwardly and is provided with a pair of parallel longitudinal slots 42. These slots are positioned in alignment with corresponding grooves 43 formed in the aperture plate and are positioned so as to be opposite the perforations in the edges of motion picture film which is to be advanced past the aperture 33. The slots 42 are adapted to receive claws 45 which are mounted on an end plate 46 formed on the end of a shuttle fork 47.

The shuttle fork 47 is formed with a rod 48 thereon, such rod being slidably and pivotally attached to the supporting plate 14 by means of a swinging sleeve or block 49. The construction of the sleeve or block 49 is best illustrated in Fig. 3 where it is shown as being formed on the end of a pin 50 that extends into a sleeve 51 which is attached to the supporting plate 14 by means of a screw and flange connection 52. The pin 50 is held against outward movement in the sleeve 51 by the head 53 of a screw 54 which engages a shoulder formed by an enlarged recess on the inner end of the sleeve member 51.

From the construction so far described it will be seen that the shuttle fork 47 may be advanced forwardly into a film perforation at the upper end of the slot 42 and may be moved downwardly carrying the film down past the aperture 32 after which it may be withdrawn and lifted to the upper position shown in Fig. 1. The means for effecting this last mentioned movement comprises a link or lever member 56 which has its lower end portion pivotally attached to the shuttle fork 47 as indicated at 57, and has its upper end mounted upon a pin 58 which forms a part of the wheel crank 21. The upper end of the link is retained against outward movement upon the pin 58 by means of a washer 59 and a screw 60.

For the purpose of guiding the movement of the link 56 and consequently obtaining the proper throw of the shuttle fork 47, I provide the link 56 with a slot 61 through which a bushing 62 on a fulcrum pin 63 slidably extends. The fulcrum pin 63 has a head 64 formed on its inner end and the headed portion of the pin extends through a sleeve 65 which is attached to the supporting plate 14 by a flange and screw connection indicated by reference numeral 66.

Reference numeral 67 indicates a bushing which is mounted upon the guide or bushing plate 30 opposite an aperture 68 formed in the aperture plate 12. This bushing and aperture are adapted to receive a pilot pin 69 which is provided for the purpose of holding the film F stationary while the shuttle fork is being moved from its extreme lowermost position to the upper position shown in Fig. 1.

As was pointed out earlier in the specification, it is essential in the operation of a device of this character that the movement of the pilot pin be correlated with the movement of the shuttle fork so that the pilot pin is entering a perforation in the film while the prongs or claws of the shuttle fork are leaving their perforations. For the purpose of effecting such a movement of the pilot pins, I propose to operate them from the link 56 which is provided with a forwardly extending portion 70 containing a slot 71 adapted to receive a pin or block 72 which is mounted on the outer end of a bracket 73 to which the pilot pins are attached. It will be noted that the arrangement of the pilot pins in their guide bushings and the position of the block 72 is such that this block or pin is situated between the fulcrum pin 63 and the center line of the drive shaft 20. From this construction it will be seen that the pilot pin is moved outwardly away from the aperture plate at the extreme upper throw of the crank and is moved inwardly toward the aperture plate at the extreme lower throw of the crank, and that while the crank moving in the direction of the arrow A is traveling downwardly drawing the film down past the aperture 33, the pilot pins are out of engagement, but while the crank is moving upwardly carrying the shuttle fork to the position shown in Fig. 1, the pilot pin remains in engagement with the perforations in the film.

Figure 6:
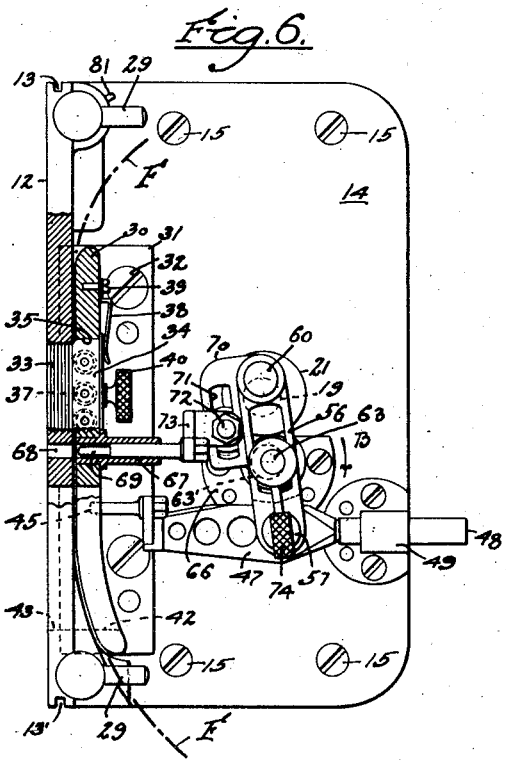
Fig. 6 is an elevational view similar to Fig. 1, but showing the movement as having been adjusted for threading the camera.

It was pointed out as one of the objects of this invention to provide means for throwing the pilot pin out of operative position for threading the camera, and to effect such a movement of the pilot pins I have made the inner end portion 63' of the fulcrum pin 63 in the form of an eccentric and have provided the outer end of the fulcrum pin 63 with a handle 74 which cooperates with the sleeve 75 to hold these parts in assembled relation and may be used to rotate the pin 63 for swinging the cam from the position shown in Fig. 1 in which the pilot pins are adapted to engage the film, to the position shown in Fig. 6 where the pilot pins are withdrawn from a film engaging position. For the purpose of locking the fulcrum pin 63 in these two extreme positions, I provide the pin with a passage 76 in alignment with which a cup member 77 is mounted on the sleeve 65. This cup member 77 contains a compression spring 78 which presses a ball 80 upwardly into the passage 76 in the pin 63 so that the ball lock will be effective to hold the pin in two positions separated by substantially 180°.

In threading the camera the movement is adjusted so that the shuttle fork assumes the position shown in Fig. 6. The handle member 74 is rotated downwardly in the direction of the arrow B to the position shown in Fig. 6, and such rotation is effective to slide the pilot pins rearwardly so that the film F may be drawn down through the space between the guide plate and the aperture plate.

Reference numeral 81 indicates a pin or a pair of pins mounted upon the upper sleeve member 26 on the aperture plate and adapted to engage apertures in the film F during a threading operation. These pins are positioned so that a standard motion picture film when engaged therewith is positioned with apertures therein directly opposite the pilot pins 69 and by using this construction it is unnecessary to make any further adjustment of the film after it is placed in the space between the guide plate and the aperture plate and drawn tight, the only other operation necessary being to swing the handle 74 upwardly to the position shown in Fig. 1 after which the movement is ready for operation.

Figure 7:
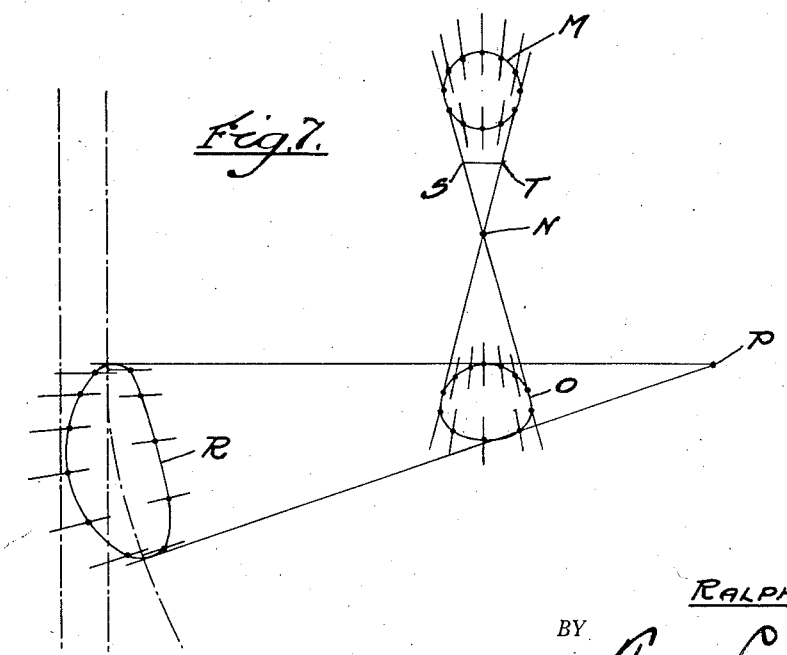
Fig. 7 is a diagrammatic view illustrating the operation of a movement of the type contemplated by this invention.

Fig. 7 illustrates the path of travel of the shuttle fork and the pilot pin during the operation of a movement of the type contemplated by this invention. The circle M indicates the path of the crank pin 58; N indicates the position of the fulcrum pin 63; O indicates the path of travel of the pivot point 57 where the link 56 is connected to the shuttle fork 47; P indicates the position of the block 49 and R illustrates the path of travel of the shuttle fork. The line S—T indicates the distance traveled by the pilot pin during the movement of the shuttle fork.

It will be apparent from the foregoing description that the mechanical movement contemplated by this invention is of simple form and construction; it is positive in its operation; it has no complicated wearing parts difficult to replace, and consequently may be economically manufactured and maintained.

It is to be understood that while I have herein described and illustrated one preferred form of my invention, the invention is not limited to the precise construction described above, but includes within its scope whatever changes fairly come within the spirit of the appended claims.

I claim as my invention:

1. A movement mechanism for use in combination with an aperture plate embodying: a rotatable member; a fixed supporting plate; a shuttle fork having a sliding pivotal connection with said supporting plate; a slotted link interposed between said rotatable member and an intermediate point on said shuttle fork; a fulcrum pin mounted on said supporting plate in sliding engagement with the slot in said link; a pilot pin; and pin and slot means connecting said pilot pin with said link.

2. A movement mechanism for use in combination with an aperture plate embodying: a rotatable member; a fixed supporting plate; a shuttle fork having a sliding pivotal connection with said supporting plate; a slotted link interposed between said rotatable member and an intermediate point on said shuttle fork; a fulcrum pin mounted on said supporting plate in sliding engagement with the slot in said link; a pilot pin; and pin and slot means connecting said pilot pin with said link, said fulcrum pin being eccentrically mounted on said supporting plate for optionally moving said shuttle fork and said pilot pin as a unit toward and away from said aperture plate.

3. A movement mechanism for use in combination with an aperture plate embodying: a rotatable member; a fixed supporting plate; a shuttle fork having a sliding pivotal connection with said supporting plate; a slotted link having its ends pivotally attached to said rotatable member and to an intermediate point on said shuttle fork; a fulcrum pin mounted on said supporting plate in sliding engagement with the slot in said link; a pilot pin; and means for operating said pilot pin from said link comprising a transverse pin attached to said pilot pin and slidably engaging a slot in said link.

4. A movement mechanism for use in combination with an aperture plate embodying: a fixed supporting plate; a drive shaft rotatably supported by said supporting plate; a crank mounted on said drive shaft; a slotted link pivotally attached to said crank; a fulcrum member mounted on said supporting plate in sliding engagement with a slot in said link; a shuttle fork slidably and pivotally mounted on said supporting plate; means connecting the free end of said link to an intermediate point on said shuttle fork; a pilot pin; and pin and slot means connecting said pilot pin to said link.

5. A movement mechanism for use in combination with an aperture plate embodying: a fixed supporting plate; a drive shaft rotatably supported by said supporting plate; a crank mounted on said drive shaft; a slotted link pivotally attached to said crank; a fulcrum member mounted on said supporting plate in sliding engagement with a slot in said link; a shuttle fork slidably and pivotally mounted on said supporting plate; means connecting the free end of said link to an intermediate point on said shuttle fork; a pilot pin; and pin and slot means connecting said pilot pin to said link, said fulcrum member being eccentrically mounted on said supporting plate for optionally swinging said pilot pin toward or away from said aperture plate.

6. A movement mechanism of the class described embodying: a supporting plate; a drive shaft rotatably supported by said supporting plate; a crank on said drive shaft; a link pivotally attached to said crank, said link having a pair of slots therein; a fulcrum pin mounted on said supporting plate in sliding engagement with one of said slots; a pilot pin; a pilot pin operating block in sliding engagement with the other of said slots; a shuttle fork slidably and pivotally mounted on said supporting plate; and means connecting said link to an intermediate point of said shuttle fork.

7. A movement mechanism of the class described embodying: a supporting plate; a drive shaft rotatably supported by said supporting plate; a crank on said drive shaft; a link pivotally attached to said crank, said link having a pair of slots therein; a fulcrum pin mounted on said supporting plate in sliding engagement with one of said slots; a pilot pin; a pilot pin operating block in sliding engagement with the other of said slots; a shuttle fork slidably and pivotally mounted on said supporting plate; and means connecting said link to an intermediate point on said shuttle fork, said pilot pin being situated in a horizontal plane between said fulcrum pin and said drive shaft.

In testimony whereof, I have hereunto set my hand at Los Angeles, California, this 18th day of February, 1931.

RALPH G. FEAR.